United States Patent
Huss (10) Patent No.: US 11,573,972 B2
(45) Date of Patent: Feb. 7, 2023

(54) AUTOMATICALLY DETERMINING FLAGS FOR A COMMAND-LINE INTERFACE IN A DISTRIBUTED COMPUTING ENVIRONMENT

(71) Applicant: Red Hat, Inc., Raleigh, NC (US)

(72) Inventor: Roland Huss, Pegnitz (DE)

(73) Assignee: RED HAT, INC., Raleigh, NC (US)

( * ) Notice: Subject to any disclaimer, the term of this patent is extended or adjusted under 35 U.S.C. 154(b) by 349 days.

(21) Appl. No.: 16/884,859

(22) Filed: May 27, 2020

(65) Prior Publication Data

US 2021/0374151 A1  Dec. 2, 2021

(51) Int. Cl.
G06F 16/25 (2019.01)
G06F 9/46 (2006.01)
G06F 9/54 (2006.01)

(52) U.S. Cl.
CPC ............ G06F 16/252 (2019.01); G06F 9/465 (2013.01); G06F 9/541 (2013.01)

(58) Field of Classification Search
CPC ......... G06F 9/451; G06F 9/465; G06F 16/252
See application file for complete search history.

(56) References Cited

U.S. PATENT DOCUMENTS 5,758,348 A * 5/1998 Neubauer ............. G06F 16/289
5,771,354 A * 6/1998 Crawford .............. G06F 9/5072
  709/219
5,920,868 A * 7/1999 Fowlow ................. G06F 9/465
6,502,102 B1 * 12/2002 Haswell ............. G06F 11/3664
  707/999.102
6,842,906 B1 * 1/2005 Bowman-Amuah ... G06F 9/465
  719/330

(Continued)

FOREIGN PATENT DOCUMENTS

CN  10515704 A  11/2019
CN  11704033 A  1/2020

OTHER PUBLICATIONS

"Extend the Kubernetes API with Custom Resource Definitions," The Kubernetes, https://kubernetes.io/docs/tasks/access-kubernetes-api/custom-resources/custom-resource-definitions/.

(Continued)

*Primary Examiner* — Eliyah S. Harper
(74) *Attorney, Agent, or Firm* — Kilpatrick Townsend & Stockton LLP (57) ABSTRACT

Flags for a command-line interface (CLI) can be automatically determined. In one example, a system can receive a user input through the CLI to manipulate an object in a computing environment. The user input can include a flag for setting a customizable parameter of the object to a particular value. The system can also receive definition data specifying one or more customizable parameters for the object. The system can then determine one or more available flags associated with the one or more customizable parameters specified in the definition data, where the available flag(s) are usable for configuring the one or more customizable parameters of the object. Based on the available flag(s), the system can determine if the flag in the user input is valid. If so, the system can manipulate the object in the computing environment such that the manipulated object has the particular value for the customizable parameter.

20 Claims, 4 Drawing Sheets

(56) References Cited

U.S. PATENT DOCUMENTS

| | | | |
|---|---|---|---|
| 7,080,051 B1* | 7/2006 | Crawford | G06Q 40/12 |
| | | | 717/172 |
| 7,657,869 B2* | 2/2010 | Huene | G06F 8/71 |
| | | | 717/121 |
| 10,348,642 B2 | 7/2019 | Jaisinghani et al. | |
| 2002/0049603 A1* | 4/2002 | Mehra | G06F 9/4488 |
| | | | 726/3 |
| 2003/0014513 A1* | 1/2003 | Ruths | G06F 9/465 |
| | | | 709/223 |
| 2005/0177818 A1* | 8/2005 | Huene | G06F 8/71 |
| | | | 717/116 |
| 2006/0129983 A1* | 6/2006 | Feng | G06F 9/465 |
| | | | 717/120 |
| 2018/0032739 A1* | 2/2018 | Gupta | G06F 21/602 |
| 2019/0243547 A1* | 8/2019 | Duggal | G06F 3/0619 |
| 2020/0134002 A1* | 4/2020 | Tung | H04L 67/34 |
| 2021/0318914 A1* | 10/2021 | Moyer | G06F 16/285 |

OTHER PUBLICATIONS

"Deploying Serverless Apps with Knative," IBM, Feb. 24, 2020, https://cloud.ibm.com/docs/containers?topic=containers-serverless-apps-knative.

"Knative," Google Cloud, https://cloud.google.com/knative.

"Make it Easier to Consume Events Directly From Specific Sources," Knative/Eventing GitHub, Inc., Jun. 11, 2019, https://github.com/knative/eventing/issues/1381.

* cited by examiner

AUTOMATICALLY DETERMINING FLAGS FOR A COMMAND-LINE INTERFACE IN A DISTRIBUTED COMPUTING ENVIRONMENT

TECHNICAL FIELD

The present disclosure relates generally to command-line interfaces. More specifically, but not by way of limitation, this disclosure relates to automatically determining flags for a command-line interface in a distributed computing environment.

BACKGROUND

There are various types of computing environments. One typical type of computing environment is a distributed computing environment, such as a grid computing system, a computing cluster, and a cloud computing system. Some distributed computing environments allow for objects to be manipulated (e.g., instantiated or modified) therein based on a definition file describing the object. For example, Kubernetes objects can be manipulated in a Kubernetes-based cluster (or "Kubernetes cluster") based on object specifications describing the Kubernetes objects. Such Kubernetes objects are persistent entities that may invoke services or represent the state of the cluster. For example, the Kubernetes objects can describe what containerized applications are running in the cluster, the cluster resources available to those applications, and the policies around how those applications behave in the cluster.

Objects are typically manipulated in a distributed computing environment by interacting with an application programming interface (API) of the computing environment, such as the Kubernetes API in a Kubernetes cluster. For example, software applications can make calls to the API for manipulating such objects.

Some distributed computing environments offer a command-line interface through which such API calls can be made. For example, Kubernetes clusters include a command-line interface called "kubectl" that can make API calls to the Kubernetes API in response to user inputs. In general, command-line interfaces are different from graphical user interfaces and menu-driven interfaces in that command-line interfaces are text-based user interfaces that process textual commands (commands formed from lines of text) using software components called a command-line interpreters.

DETAILED DESCRIPTION

Customizing objects in a distributed computing environment such as Kubernetes is generally a manual, difficult process that often requires multiple software applications. For example, a user may open a text editor to manually draft an object specification with the desired customizations for a Kubernetes object in a particular format that is specific to Kubernetes objects. That format may require boilerplate language and default settings that are confusing and hard to memorize. And, since these text editors do not provide any support or feedback about which parameters are configurable or how to go about configuring those parameters, users are often left to their own devices to figure out how to draft such object specifications. Even assuming the user is capable of drafting the object specification correctly despite these challenges, the user may then need to access a command-line interface of another software application (e.g., kubectl) and issue one or more commands to that command-line interface in order to apply the desired customizations specified in the object specification to an object. If errors in applying those customizations occur, the user may then need to switch back-and-forth between the text editor and the command-line interface to try to resolve these errors, iteratively tweaking the object specification and then trying to apply the customizations through the command-line interface. Switching back-and-forth between software applications in this way is a time consuming, tedious, and difficult process. Additionally, the user is often provided with little or no feedback during this process about how to resolve the errors, since the command-line interface tends to provide generic error messages.

Some examples of the present disclosure can overcome one or more of the abovementioned problems by providing a command-line interface that can receive a user input for customizing an object in a computing environment, perform an on-the-fly validation of one or more flags provided in the user input based on a set of available flags, and apply the user's customizations to an object if the flags in the user input are valid. This is significantly faster and easier than traditional approaches, for example, since it may only require a single command-line input via a single piece of software (the command-line interface) to customize an object in a computing environment. Additionally, the command-line interface can automatically determine the available flags during runtime of the command-line interface. For example, the command-line interface can automatically receive a definition file for an object, parse the definition file to determine customizable parameters of the object, and determine the available flags based on the customizable parameters. As used herein, "available flags" refer to flags that are determined on-the-fly by the command-line interface and available to the user to configure the customizable parameters, rather than existing flags pre-programmed into the command-line interface. Determining the available flags at runtime based on the definition file can enable the available flags to be dynamic rather than static, since the available flags can change by manipulating the definition file. Determining the available flags at runtime based on the definition file can also allow the command-line interface to be more generic and universally applicable, since the command-line interface does not need to be pre-programmed with the available flags.

In some examples, the definition file can also specify descriptors of the customizable parameters, so the command-line interface can parse the definition file to determine the descriptors. The command-line interface can then generate help information that includes the determined available flags and their corresponding descriptors. The command-line interface can provide the help information to a user, for example in response to a help command from the user. This can assist the user with understanding what object parameters are customizable and how to configure those parameters, which can improve the user experience.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
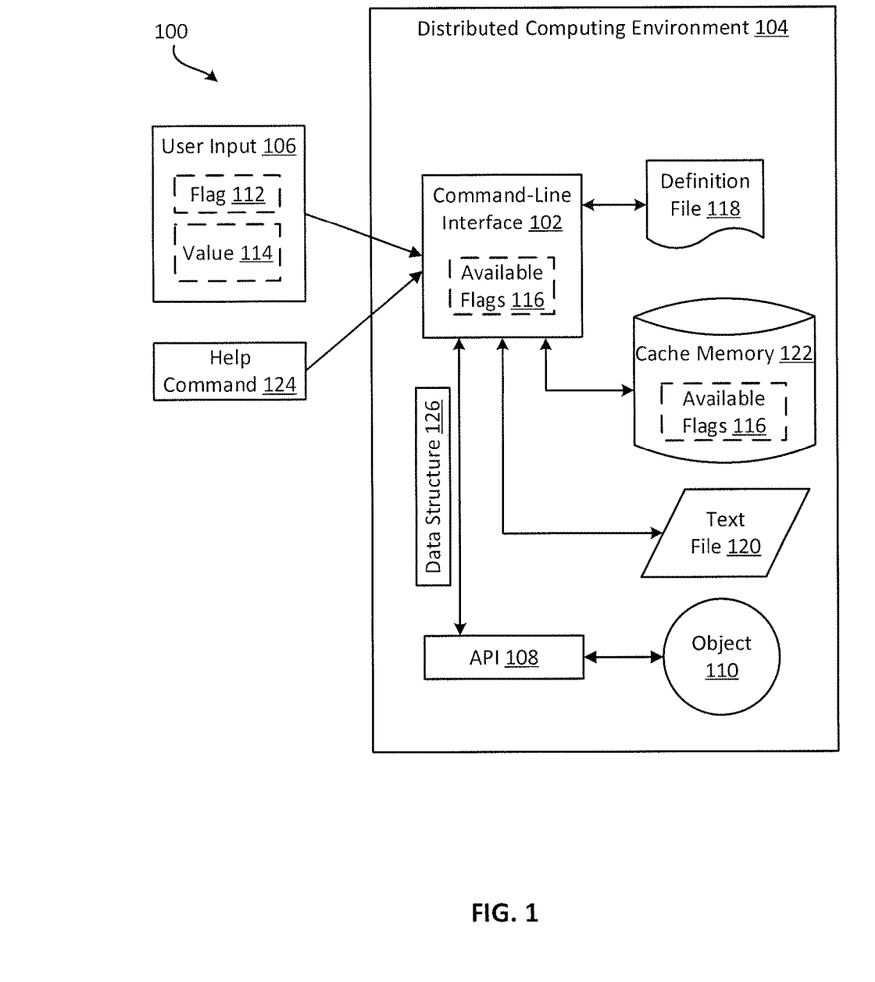
FIG. 1 is a block diagram of an example of a system for automatically determining flags for a command-line interface in a distributed computing environment according to some aspects of the present disclosure.

FIG. 1 is a block diagram of an example of a system 100 for automatically determining flags for a command-line interface 102 in a distributed computing environment 104 according to some aspects of the present disclosure. The distributed computing environment is formed from multiple nodes (e.g., physical or virtual machines) that can communicate with one another to perform one or more tasks. In one example, the distributed computing environment 104 may be a Kubernetes cluster.

The command-line interface 102 is a text-based user interface that can process textual commands from users or other pieces of software and execute one or more operations based on the textual commands. For example, a user can provide user input 106 to the command-line interface 102. The command-line interface 102 can process the user input 106 and execute one or more operations based on the user input 106, such as making API calls to an API 108 of the distributed computing environment 104. In an example in which the distributed computing environment 104 is a Kubernetes cluster, the API 108 can be the Kubernetes API.

In some examples, the user input 106 can be configured to manipulate (e.g., instantiate or modify) an object 110 in the distributed computing environment 104. For example, the user input 106 may include a command configured to cause the command-line interface 102 to interact with the API 108 and thereby instantiate the object 110.

The object 110 may have one or more customizable parameters that are user configurable, for example if the object 110 is a custom resource (also sometimes referred to as a "custom object") in a Kubernetes cluster. To customize the object 110, the user input 106 can include a flag 112 and a value 114, where the flag 112 is for setting a customizable parameter of the object 110 to the value 114. One example of the user input 106 can be "create TwitterSource-access-token=ExToken-access-token-secret=ExSecret," which is a command for instantiating a service object that connects to Twitter® using the access token and the token secret to receive new tweets. In this example, the customizable parameters of the object 110 are the access token and the token secret, the flags 112 are the "-access-token" flag and the "-access-token-secret" flag, and the values 114 are "ExToken" and "ExSecret" respectively. The command-line interface 102 can receive the user input 106 with the flag 112 and the value 114 and issue one or more API calls to the API 108, which can cause the distributed computing environment 104 to instantiate the object 110 such that the value 114 is assigned to a customizable parameter corresponding to the flag 112.

In some examples, the command-line interface 102 can determine the available flags 116 usable for configuring the customizable parameters of the object 110 during runtime, rather than the available flags 116 being preprogrammed into the command-line interface 102. For example, the command-line interface 102 can determine one or more of the available flags 116 on-the-fly based on a definition file 118 for the object 110, as described in greater detail below, rather than those available flags being preprogrammed flags in the command-line interface 102. The ability of the command-line interface 102 to determine the available flags 116 at runtime based on the definition file 118 can enable the available flags 116 to be dynamic rather than static. And determining the available flags 116 based on the definition file 118 can allow the command-line interface 102 to be more generic, in the sense that the command-line interface 102 need not be pre-programmed with information specific to the object 110 or its customizable parameters ahead-of-time.

More specifically, the command-line interface 102 can receive a definition file 118 corresponding to an object 110 from a source that is external to the command-line interface 102. The source may or may not be located in the distributed computing environment 104. For example, the command-line interface 102 can request the definition file 118 from the API 108, which can return the definition file 118 back to the command-line interface 102. As another example, the command-line interface 102 can retrieve the definition file 118 from a storage device, which may be internal or external to the distributed computing environment 104.

The definition file 118 can be unique or specific to the object 110 and specify various features of the object 110, such as the customizable parameters available for the object. Other objects can have other corresponding definition files. The definition file 118 can be in any suitable format, such as a hierarchical format. Examples of such hierarchical formats can include an Extensible Markup Language (XML) format, a JavaScript Object Notation (JSON) format, or a YAML Ain't Markup Language (YAML) format.

Figure 2:
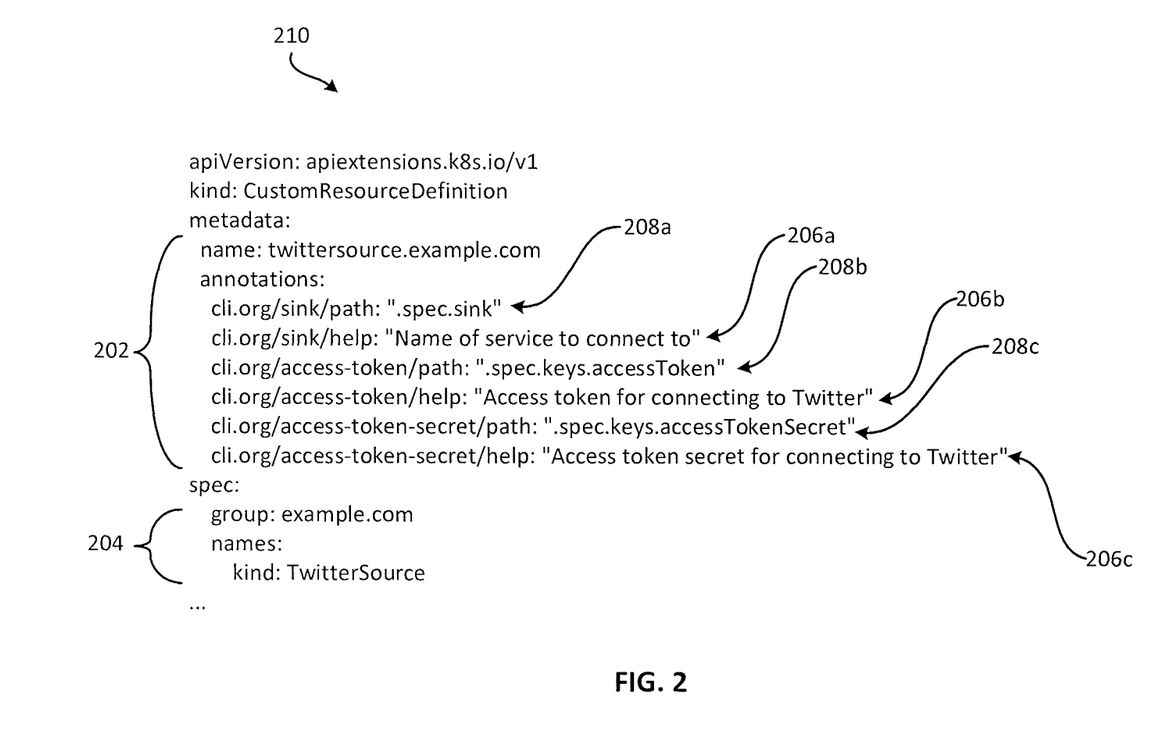
FIG. 2 is an example of definition data in a definition file according to some aspects of the present disclosure.

One example of a definition file 118 that includes definition data 210 is shown in FIG. 2. In this example, the object is a custom resource in Kubernetes and the definition file is a custom resource definition (CRD). A custom resource is a custom object for extending the functionality of the Kubernetes API, where characteristics of the custom resource are defined by the custom resource definition. But other examples can involve other types of objects.

As shown in FIG. 2, the definition data 210 includes an apiVersion field for specifying an API version usable with the object; a kind field for specifying a type of the object; a metadata section 202 for specifying metadata about the object; and a specification (or "spec") section 204 for specifying conditions that are specific to the type of object, such as possible fields for the object.

The metadata section 202 specifies the customizable parameters 208a-c of the object 110 and includes descriptors 206a-c of the customizable parameters 208a-c. In some examples, the customizable parameters 208a-c and descriptors 206a-c are manually added to the metadata section 202 of the definition file by a developer or another user after the initial creation of the definition file, since such information is not traditionally included in such definition files.

In the example shown in FIG. 2, the metadata section 202 indicates that the customizable parameters 208a-c are "sink," "access-token," and "access-token-secret." The customizable parameters 208a-c can be specified in the metadata section 202 by including a path to a corresponding field in the object's structure, which may be a hierarchical (e.g., tree-like) structure. For example, customizable parameter 208a may have a path of ".spec.sink" corresponding to the object field:

```
spec:
    sink: myValue
``` where "myValue" is user customizable via a flag input to the command-line interface. And the customizable parameter 208b may have a path of ".spec.keys.accessToken" corresponding to the object field:

```
spec:
    keys:
        accessToken: myTokenValue
``` where "myTokenValue" is user customizable via a flag input to the command-line interface. Similarly, the customizable parameter 208c may have a path of ".spec.keys.accessTokenSecret" corresponding to the object field:

```
spec:
    keys:
        accessTokenSecret: mySecretValue
``` where "myTokenSecret" is user customizable via a flag input to the command-line interface. From this information, the command-line interface can generate the following tree for the object:

```
kind: TwitterSource
spec:
    sink: myValue
    keys:
        accessToken: myTokenValue
        accessTokenSecret: mySecretValue
```

Other ways of specifying the customizable parameters 208a-c in the definition file, and other types of hierarchical structures, are also possible. For example, the definition file could specify the above information using the OpenAPI Schema. In one such example, the accessToken customizable parameter could be specified as follows:

```
openAPIV3Schema:
    properties:
        spec:
            properties:
                accessToken:
                    properties:
                        secretKeyRef:
                            #Name of a cli option mapping to this field
                            x-cli-option: "access-token"
                            #Help message which can be used by a CLI on
                            the help page
                            x-cli-help: "GitHub access token."
                            type: object
                    type: object
                ...
```

Each of the customizable parameters 208a-c can also have a corresponding descriptor that describes the customizable parameter. The descriptors 206a-c are specified in FIG. 2 using the format "cli.org/<customizable parameter>/help: '<explanatory information here>'," but other ways of specifying the descriptors 208a-c are possible.

It will be appreciated that while FIG. 2 gives one example of definition data 210, other examples may include more definition data, less definition data, different definition data, or a different order of the definition data 210 than is depicted in FIG. 2.

Referring back to FIG. 1, after receiving the definition file 118, the command-line interface 102 can determine the one or more customizable parameters specified in the definition file 118. For example, the command-line interface 102 can extract the definition data from the definition file 118 and parse the definition data to determine the one or more customizable parameters. As one particular example, the command-line interface 102 can parse the definition data 210 of FIG. 2 to determine that the customizable parameters are "sink," "access-token," and "access-token-secret."

The command-line interface 102 can next determine the available flags 116 based on the customizable parameters specified in the definition file 118. The available flags 116 may be the same as the customizable parameters, or derivations thereof. For example, the available flags 116 may be "-sink," "-access-token," and "-access-token-secret," which are the same as the customizable parameters as prepended with double hyphens. In another example, the available flags may be "-s," "-at," and "-ats," which are the first letters of the words "sink," "access-token," and "access-token-secret," respectively. Any suitable approach can be used to map the customizable parameters to the available flags 116, so long as each customizable parameter is mapped to a corresponding available flag.

In some examples, the command-line interface 102 can store the available flags 116 in a volatile memory, such as cache memory 122, for subsequent use. The command-line interface 102 can retrieve the available flags 116 from the volatile memory in response to future user inputs associated with the object 110, without accessing the definition file 118. For example, the command-line interface 102 can receive a second user input for manipulating the object in the distributed computing environment 104. The command-line interface 102 can receive the second user input at a later point in time after receiving the user input 106. In response to receiving the second user input, command-line interface 102 can determine one or more available flags 116 usable for configuring the object 110 by retrieving the one or more available flags 116 from the cache memory 122, without accessing the definition file 118. By avoiding repeatedly accessing the definition file 118 and repeatedly parsing the definition file 118 to determine the available flags 116 each time, the command-line interface 102 can bypass such redundancies that would otherwise consume computing resources and increase latency.

Having determined the available flags 116, in some examples the command-line interface 102 can use the determined available flags 116 to validate one or more flags 112 provided in a user input 106 associated with the object 110. For example, the command-line interface 102 can receive a user input 106 including a flag 112. The command-line interface 102 can determine that the user input 106 is associated with the object 110. For example, the command-line interface 102 can determine that the user input 106 is for manipulating the object 110. Based on determining that the user input 106 is associated with the object 110, the command-line interface 102 can determine the available flags 116 associated with the object 110. The command-line interface 102 can then compare the flag 112 input by the user to the available flags 116, to determine whether the flag 112 is one of the available flags 116. If so, the flag 112 is valid. Otherwise, the flag 112 is invalid.

Additionally or alternatively, the command-line interface 102 can validate a value 114 corresponding to the flag 112 in the user input 106. For example, the flag 112 can correspond to a customizable parameter specified in the definition file 118 for the object 110, as mentioned above. And the customizable parameter may be associated with a particular value-type (e.g., a scalar, an array, or a key-value pair) or a particular value-range in the definition file 118. So, the command-line interface 102 can analyze the definition file 118 to determine the particular value-type or the particular value-range associated with the customizable parameter. The command-line interface 102 can then determine whether the value 114 is of the particular value-type or falls within the particular value-range specified in the definition file 118. If so, the value 114 is valid. Otherwise, the value 114 is invalid.

If the command-line interface 102 determines that the flag 112 or the value 114 is invalid, the command-line interface 102 can output an error notification and prevent the object 110 from being manipulated. And if the command-line interface 102 determines that the flag 112 and the value 114 are valid, then the command-line interface 102 can manipulate (e.g., directly or indirectly) the object 110 in the distributed computing environment 104.

The command-line interface 102 can manipulate the object 110 such that the customizable parameter associated with the flag 112 is assigned the value 114. The command-line interface 102 can manipulate the object 110 in various ways. In one example, the command-line interface 102 can transmit one or more commands to the API 108, which can cause the distributed computing environment 104 to manipulate the object 110 such that the object 110 is assigned the value 114 for the customizable parameter corresponding to the flag 112. As another example, the command-line interface 102 can generate a data structure 126 indicating that the customizable parameter corresponding to the flag 112 is to have the value 114. The data structure 126 can have any suitable format, such as a JSON or YAML format, and can be stored in volatile memory such as RAM. The command-line interface 102 can then transmit the data structure 126 to the API 108, which can cause the distributed computing environment 104 to manipulate the object 110 such that the object 110 is assigned the value 114 for the customizable parameter.

In some examples, the command-line interface 102 can generate a text file 120 indicating a configuration of the object 110. For example, the configuration can specify that the customizable parameter corresponding to the flag 112 is to have the value 114. The text file 120 is different from the definition file 118 and the data structure 126, and may be stored in non-volatile memory such as a hard disk. The text file 120 can be designed to be easily transferrable among users and distributed computing environments. This can allow one or more pieces of software in one or more distributed computing environments to ingest the text file 120 and generate (e.g., automatically generate) one or more instances of the object 110 in accordance with the configuration specified in the text file 120. The text file 120 may also be used to manipulate the object 110 in some cases. For example, the command-line interface 102 can transmit a command referencing a location of the text file 120 to the API 108, which can cause the distributed computing environment 104 to access the text file 120 and manipulate the object 110 in accordance with the configuration specified in the text file 120.

In some examples, the command-line interface 102 can receive other types of user inputs, such as a help command 124 from the user. The help command 124 can be for retrieving a description of some or all of the available flags 116. In response to receiving the help command 124, the command-line interface 102 can generate help information that describes the available flags 116 using the descriptors included in the definition file 118 for the object 110. For example, the command-line interface 102 can generate the following help information based on the descriptors 206a-c in FIG. 2:

Create a Twitter Source
Options:
--sink                  Name of service to connect to
--access-token          Access token for connecting to Twitter
--access-token-secret   Access token secret for connecting to Twitter The command-line interface 102 can then output the help information to the user, which can assist the user with understanding which flags are available and how to use them. Like the available flags 116, the command-line interface 102 can determine the descriptors during runtime, rather than the descriptors being preprogrammed into the command-line interface 102. This can enable the descriptors to be dynamic rather than static and can allow the command-line interface 102 to be more generic, since the command-line interface 102 does not need to be pre-programmed with such help information ahead-of-time.

It will be appreciated that while FIG. 1 depicts a certain number and arrangement of components, other examples can involve more components, fewer components, different components, or a different arrangement of the components shown in FIG. 1. For example, although FIG. 1 depicts a distributed computing environment 104, other examples may be implemented in other types of computing environments that may not be distributed. It will also be appreciated that although certain functionality is described herein as being implemented by the command-line interface 102, in other examples it is possible that other components of the distributed computing environment 104 may execute at least some that functionality. For example, another component of the distributed computing environment 104 may receive the definition file 118, extract the definition data from the definition file, parse the definition data to determine the available flags 116, and then transmit the available flags 116 to the command-line interface 102 for use in validating the user input 106. Additionally or alternatively, the other component may parse the definition data from the definition file 118 to determine the descriptors. The other component can then transmit the descriptors to the command-line interface 102 for use in generating help information in response to a help command 124.

Figure 3:
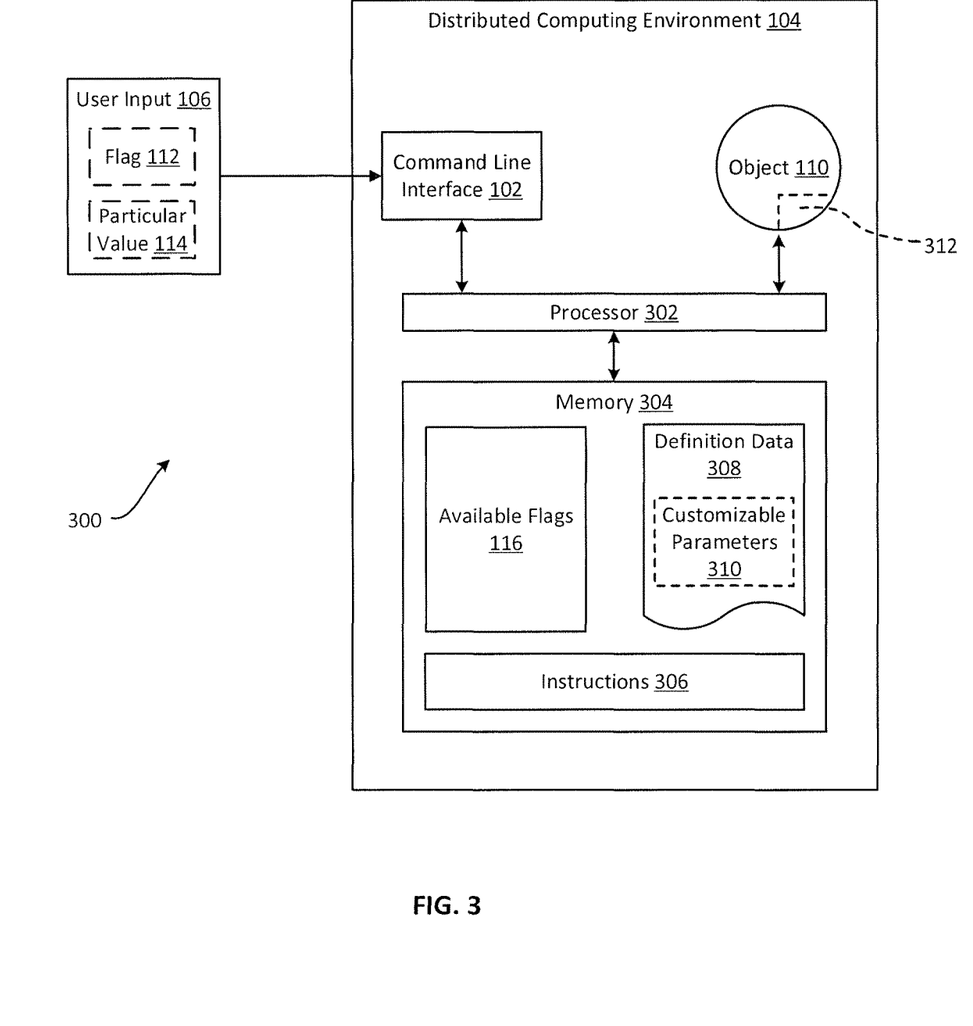
FIG. 3 is a block diagram of another example of a system for automatically determining flags for a command-line interface in a distributed computing environment according to some aspects.

FIG. 3 is a block diagram of another example of a system 300 for automatically determining flags for a command-line interface 102 in a distributed computing environment 104 according to some aspects. The system 300 includes a processor 302 communicatively coupled to a memory 304. The processor 302 and the memory 304 may be located in a common housing of a computing device or distributed from one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory device includes a non-transitory computer-readable medium. A non-transitory computer-readable medium can include electronic, optical, magnetic, or other storage devices capable of providing the processor 302 with the instructions 306 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 306.

In some examples, the processor 302 receive a user input 106 through the command-line interface 102. The user input 106 can be for manipulating an object 110 in the distributed computing environment 104. The user input 106 can include a particular flag 112 for setting a customizable parameter 312 of the object 110 to a particular value 114.

The processor 302 can also receive definition data 308 corresponding to the object 110. The processor 302 can receive the definition data 308 from a source internal or external to the distributed computing environment 104. The definition data 308 can specify one or more customizable parameters 310 for the object 110.

The processor 302 can determine one or more available flags 116 associated with the one or more customizable parameters 310 specified in the definition data 308, where the one or more flags 116 are usable with the command-line interface 102 for configuring the one or more customizable parameters 310 of the object 110. For example, the processor 302 can determine the one or more available flags 116 based on the one or more customizable parameters 310.

Having determined the one or more available flags 116, the processor 302 can determine if the particular flag 112 in the user input 106 is valid. In some examples, the processor 302 can determine that the particular flag 112 is valid based on the one or more available flags 116 including the particular flag 112. Based on determining that the particular flag 112 is valid, the processor 302 can manipulate the object 110 in the distributed computing environment 104 such that the manipulated object 110 has the particular value 114 for the customizable parameter 312. The processor 302 may additionally or alternatively be able to perform other functionality described herein.

Figure 4:
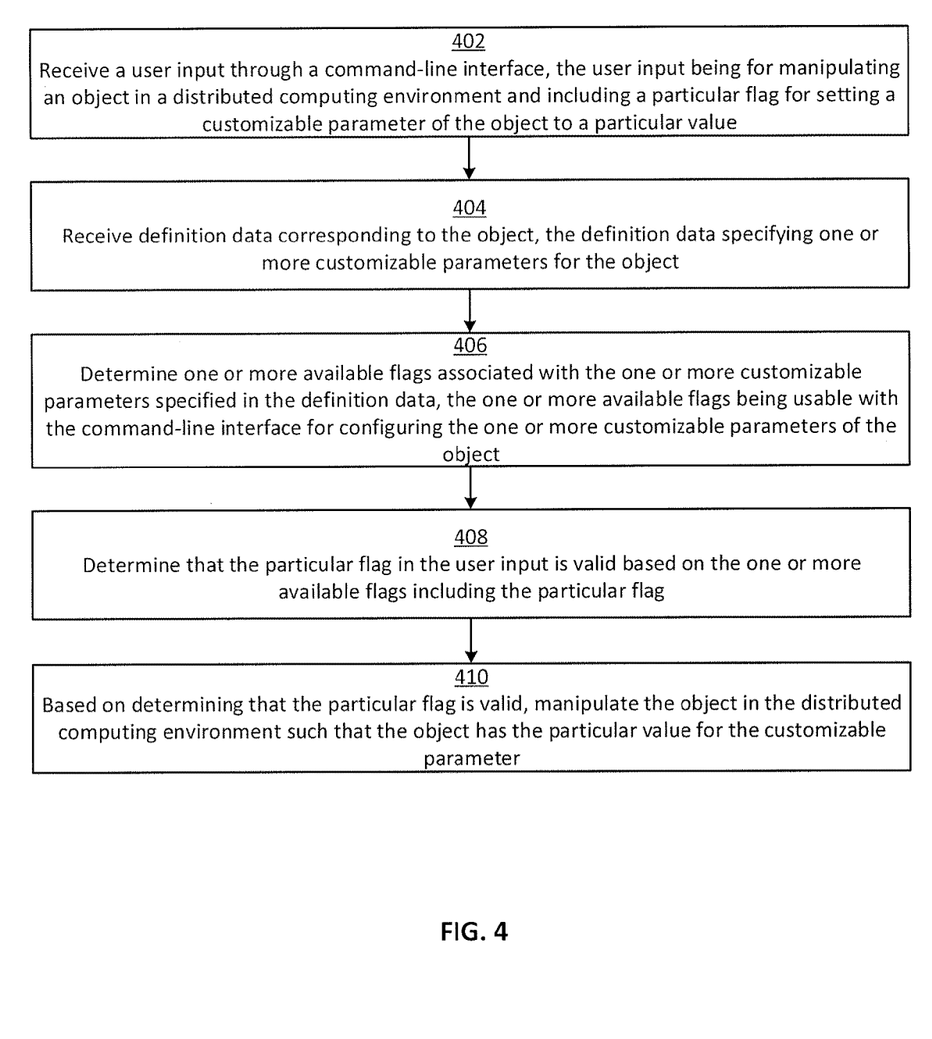
FIG. 4 a flow chart of an example of a process for automatically determining flags for a command-line interface in a distributed computing environment according to some aspects of the present disclosure.

FIG. 4 a flow chart of an example of a process for automatically determining flags for a command-line interface in a distributed computing environment according to some aspects of the present disclosure. While FIG. 4 depicts a certain sequence of operations for illustrative purposes, other examples can involve more operations, fewer operations, different operations, or a different order of the operations than is depicted in FIG. 4. The steps of FIG. 4 are described below with reference to components of FIG. 3.

In block 402, the processor 302 receives a user input 106 through the command-line interface 102. The user input 106 can be for manipulating an object 110 in the distributed computing environment 104. As used herein, "manipulating" an object can include instantiating or modifying the object. The user input 106 can include a particular flag 112 for setting a customizable parameter 312 of the object 110 to a particular value 114.

In block 404, the processor 302 receives definition data 308 corresponding to the object 110. The definition data 308 can specify one or more customizable parameters 310 for the object 110. In some examples, the processor 302 can receive the definition data 308 from the distributed computing environment 104. For example, the processor 302 can request the definition data 308, or a definition file containing the definition data 308, from an API (e.g., API 108 of FIG. 1) of the distributed computing environment 104. The API can respond to the request by providing the definition data 308 or the definition file to the processor 302.

In block 406, the processor 302 determines one or more available flags 116 associated with the one or more customizable parameters 310 specified in the definition data 308. The one or more available flags 116 are usable with the command-line interface 102 for configuring the one or more customizable parameters 310 of the object 110. The processor 302 can determine the one or more available flags 116 based on the one or more customizable parameters 310 specified in the definition data 308.

In block 408, the processor 302 determines that the particular flag 112 in the user input 106 is valid based on the one or more available flags 116 including the particular flag 112. For example, the processor 302 can compare the particular flag 112 to the one or more available flags 116 to determine if the particular flag 112 is present among the one or more available flags 116.

In block 410, the processor 302 manipulates the object 110 in the distributed computing environment 104 such that the manipulated object 110 contains the particular value 114 for the customizable parameter 312. The processor 302 can manipulate the object 110 based on determining that the particular flag 112 is valid. In some examples, manipulating the object 110 in the distributed computing environment 104 can include interfacing with an API of the distributed computing environment 104 for causing the distributed computing environment 104 to manipulate the object 110. For example, the processor 302 can determine the paths to the customizable fields in the object's hierarchical structure based on the definition data 308, where the customizable fields serve as the customizable parameters. The processor 302 can also determine names for the customizable fields, as specified in the definition data 308. The processor 302 can further determine the input values provided by the user for the customizable fields. The processor 302 can then provide the paths, names, and the input values to the API. This can cause the distributed computing environment 104 to apply the provided input values to the customizable fields having the provided names and located at the provided paths in the object's hierarchical structure.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory including instructions for a command-line interface, the instructions being executable by the processor for causing the command-line interface to:
   receive a command-line input including a particular flag for setting a customizable parameter of an object to a particular value;
   automatically determine one or more available flags based on one or more customizable parameters specified in definition data corresponding to the object, the one or more available flags being acceptable to the command-line interface for use in configuring the one or more customizable parameters of the object;

subsequent to receiving the command-line input and automatically determining the one or more available flags, determine whether the particular flag in the command-line input is valid by comparing the particular flag to the one or more available flags; and based on determining that the particular flag is valid, execute one or more operations configured to set the customizable parameter to the particular value for the object.

2. The system of claim 1, wherein the object is located in a distributed computing environment that is a Kubernetes cluster, the object is a custom resource in Kubernetes, and the definition data is a custom resource definition (CRD).

3. The system of claim 1, wherein the definition data specifies a name and a path for the customizable parameter in a hierarchical structure of the object.

4. The system of claim 1, wherein the memory further includes instructions that are executable for causing the command-line interface to, based on determining that the particular flag is valid:

generate a data structure specifying a configuration for the object, the configuration indicating that the customizable parameter is to have the particular value; and manipulate the object by providing the data structure to an application programming interface (API) of a distributed computing environment, the distributed computing environment being configured to receive the data structure via the API and responsively manipulate the object with the particular value for the customizable parameter.

5. The system of claim 1, wherein the command-line input is a first command-line input, and wherein the memory further includes instructions that are executable for causing the command-line interface to:

based on automatically determining the one or more available flags, store the one or more available flags in a cache memory; and subsequent to storing the one or more available flags in the cache memory:

receive a second command-line input through the command-line interface, the second command-line input being for manipulating the object in a distributed computing environment and including a flag;

automatically determine the one or more available flags without accessing the definition data by retrieving the one or more available flags from the cache memory;

determine that the flag is valid by comparing the flag to the one or more available flags retrieved from the cache memory; and subsequent to determining that the flag is valid, manipulate an instance of the object in the distributed computing environment based on the flag.

6. The system of claim 1, wherein the memory further includes instructions that are executable for causing the command-line interface to:

receive a help command from a user through the command-line interface, the help command being for retrieving a description of the one or more available flags;

retrieve one or more descriptors describing the one or more available flags from the definition data, each available flag among the one or more available flags having a corresponding descriptor among the one or more descriptors in the definition data;

generate help information that describes the one or more available flags using the one or more descriptors; and in response to receiving the help command, output the help information to the user via the command-line interface.

7. The system of claim 1, wherein the command-line interface does not have preprogrammed flags for configuring the one or more customizable parameters of the object, and wherein the one or more available flags are dynamically determined during a runtime of the command-line interface by analyzing the definition data from a definition file.

8. A method comprising:

receiving, by a command-line interface executing on a processor, a command-line input including a particular flag for setting a customizable parameter of an object to a particular value;

automatically determining, by the command-line interface, one or more available flags based on one or more customizable parameters specified in definition data corresponding to the object, the one or more available flags being acceptable to the command-line interface for use in configuring the one or more customizable parameters of the object;

subsequent to receiving the command-line input and automatically determining the one or more available flags, determining, by the command-line interface, whether the particular flag in the command-line input is valid by comparing the particular flag to the one or more available flags; and based on determining that the particular flag is valid, executing, by the command-line interface, one or more operations configured to set the customizable parameter to the particular value for the object.

9. The method of claim 8, wherein the object is located in a distributed computing environment that is a Kubernetes cluster, the object is a custom resource in Kubernetes, and the definition data is a custom resource definition (CRD).

10. The method of claim 8, wherein the definition data specifies a name and a path for the customizable parameter in a hierarchical structure of the object.

11. The method of claim 8, further comprising, based on determining that the particular flag is valid:

generating a data structure specifying a configuration for the object, the configuration indicating that the customizable parameter is to have the particular value, and manipulating the object by providing the data structure to an application programming interface (API) of a distributed computing environment, the distributed computing environment being configured to receive the data structure via the API and responsively manipulate the object with the particular value for the customizable parameter.

12. The method of claim 8, further comprising storing a configuration for the object in a text file that is different from a definition file storing the definition data, the text file being configured for use by one or more pieces of software in one or more distributed computing environments to manipulate one or more instances of the object, the one or more pieces of software being different from the command-line interface.

13. The method of claim 8, wherein the command-line input is a first command-line input, and further comprising:

based on automatically determining the one or more available flags, storing the one or more available flags in a cache memory; and subsequent to storing the one or more available flags in the cache memory:
receiving a second command-line input through the command-line interface, the second command-line input being for manipulating the object in a distributed computing environment and including a flag;
automatically determining the one or more available flags without accessing the definition data by retrieving the one or more available flags from the cache memory;
determining that the flag is valid by comparing the flag to the one or more available flags retrieved from the cache memory; and
subsequent to determining that the flag is valid, manipulating an instance of the object in the distributed computing environment based on the flag.

14. The method of claim 8, further comprising:
receiving a help command from a user through the command-line interface, the help command being for retrieving a description of the one or more available flags;
retrieving one or more descriptors describing the one or more available flags from the definition data, each available flag among the one or more available flags having a corresponding descriptor among the one or more descriptors in the definition data;
generating help information that describes the one or more available flags using the one or more descriptors; and
in response to receiving the help command, outputting the help information to the user via the command-line interface.

15. The method of claim 8, wherein the command-line interface does not have preprogrammed flags for configuring the one or more customizable parameters of the object, and wherein the one or more available flags are dynamically determined during a runtime of the command-line interface by analyzing the definition data from a definition file.

16. A non-transitory computer-readable medium comprising program code that is executable by a processor for causing the processor to:
receive a command-line input through a command-line interface, the command-line input including a particular flag for setting a customizable parameter of an object to a particular value;
automatically determine one or more available flags based on one or more customizable parameters specified in definition data corresponding to the object, the one or more available flags being acceptable to the command-line interface for use in configuring the one or more customizable parameters of the object;
subsequent to receiving the command-line input and automatically determining the one or more available flags, determine whether the particular flag in the command-line input is valid by comparing the particular flag to the one or more available flags; and
based on determining that the particular flag is valid, execute one or more operations configured to set the customizable parameter to the particular value for the object.

17. The non-transitory computer-readable medium of claim 16, wherein the command-line input is a first command-line input, and further comprising program code that is executable by the processor for causing the processor to:
based on determining the one or more available flags, store the one or more available flags in a cache memory; and
subsequent to storing the one or more available flags in the cache memory:
receive a second command-line input through the command-line interface, the second command-line input being for manipulating the object in a distributed computing environment and including a flag;
automatically determine the one or more available flags without accessing the definition data by retrieving the one or more available flags from the cache memory;
determine that the flag is valid by comparing the flag to the one or more available flags retrieved from the cache memory; and
manipulate an instance of the object in the distributed computing environment based on the flag.

18. The non-transitory computer-readable medium of claim 16, further comprising program code that is executable by the processor for causing the processor to:
receive a help command from a user through the command-line interface, the help command being for retrieving a description of the one or more available flags;
retrieve one or more descriptors describing the one or more available flags from the definition data, each available flag among the one or more available flags having a corresponding descriptor among the one or more descriptors in the definition data;
generate help information that describes the one or more available flags using the one or more descriptors; and
in response to receiving the help command, output the help information to the user via the command-line interface.

19. The non-transitory computer-readable medium of claim 16, wherein the command-line interface does not have preprogrammed flags for configuring the one or more customizable parameters of the object, and wherein the one or more available flags are dynamically determined during a runtime of the command-line interface by analyzing the definition data from a definition file.

20. The system of claim 1, wherein the memory further includes instructions that are executable for causing the command-line interface to:
receive the definition data corresponding to the object, the definition data specifying the one or more customizable parameters for the object; and
automatically determine the one or more available flags by analyzing the definition data.

\* \* \* \* \*